(12) United States Patent
Rajakarunanayake et al.

(10) Patent No.: US 9,462,533 B2
(45) Date of Patent: Oct. 4, 2016

(54) COMMUNICATION ADAPTATIONS TO INDUSTRIAL NOISE

(71) Applicant: Broadcom Corporation, Irvine, CA (US)

(72) Inventors: Yasantha Rajakarunanayake, San Ramon, CA (US); Michael David Johas Teener, Santa Cruz, CA (US); Wael William Diab, San Francisco, CA (US); Xuemin Chen, Rancho Santa Fe, CA (US); Yongbum Kim, Los Altos Hills, CA (US); Patricia Ann Thaler, Carmichael, CA (US)

(73) Assignee: Broadcom Corporation, Irvine, CA (US)

( * ) Notice: Subject to any disclaimer, the term of this patent is extended or adjusted under 35 U.S.C. 154(b) by 199 days.

(21) Appl. No.: 14/170,280

(22) Filed: Jan. 31, 2014

(65) Prior Publication Data
US 2015/0078180 A1    Mar. 19, 2015

Related U.S. Application Data

(60) Provisional application No. 61/880,035, filed on Sep. 19, 2013, provisional application No. 61/907,716, filed on Nov. 22, 2013.

(51) Int. Cl.

| | |
|---|---|
| H04L 1/00 | (2006.01) |
| H04W 40/18 | (2009.01) |
| H04L 12/24 | (2006.01) |
| H04W 40/16 | (2009.01) |
| H04W 24/04 | (2009.01) |
| H04L 12/26 | (2006.01) |
| H04W 24/02 | (2009.01) |

(52) U.S. Cl.
CPC .......... *H04W 40/18* (2013.01); *H04L 41/147* (2013.01); *H04W 40/16* (2013.01); *H04L 43/08* (2013.01); *H04W 24/02* (2013.01); *H04W 24/04* (2013.01)

(58) Field of Classification Search
CPC . H04W 24/02; H04W 24/04; H04W 72/082; H04W 40/18; H04W 40/16; H04W 52/223; H04W 52/24; H04L 43/08; H04L 43/0817; H04L 41/147
See application file for complete search history.

(56) References Cited

U.S. PATENT DOCUMENTS

| | | | | |
|---|---|---|---|---|
| 2008/0248802 | A1* | 10/2008 | Krishnamoorthy .. | H01Q 3/2605 455/445 |
| 2008/0279216 | A1* | 11/2008 | Sharif-Ahmadi ....... | H04L 47/10 370/465 |
| 2010/0279680 | A1* | 11/2010 | Reudink ............... | H04M 15/00 455/424 |
| 2011/0009141 | A1* | 1/2011 | Harada ................. | H04W 16/14 455/509 |
| 2011/0243021 | A1* | 10/2011 | Ponnuswamy ......... | H04L 41/22 370/252 |
| 2012/0164950 | A1* | 6/2012 | Nentwig ............... | H04W 28/18 455/63.1 |
| 2013/0094522 | A1* | 4/2013 | Moshfeghi ............ | H04W 88/06 370/498 |

* cited by examiner

*Primary Examiner* — Jutai Kao
(74) *Attorney, Agent, or Firm* — Brinks Gilson & Lione

(57) ABSTRACT

A device in an industrial environment may adapt communications to account for industrial noise in the industrial environment. The device may send a first communication to a destination device in the industrial environment using a first communication technology. The device may access noise prediction data for the industrial environment, and the noise prediction data may indicate predicted noise for one or more portions of the industrial environment, including a communication pathway to the destination device using the first communication technology. The device may adapt a subsequent communication to the destination device to account for the predicted noise along the communication pathway.

20 Claims, 7 Drawing Sheets

COMMUNICATION ADAPTATIONS TO INDUSTRIAL NOISE

PRIORITY CLAIM

This application claims the benefit of priority from U.S. Provisional patent application Ser. No. 61/880,035 filed on Sep. 19, 2013 and U.S. Provisional patent application Ser. No. 61/907,716 filed on Nov. 22, 2013, both of which are incorporated by reference herein in their entirety.

TECHNICAL FIELD

This disclosure relates to communication in an industrial environment. This disclosure also relates to adapting communications to industrial noise in the industrial environment.

BACKGROUND

Rapid advances in sensors, control systems, and manufacturing techniques have led to the worldwide adoption of automated manufacturing techniques for every imaginable product. The manufacturing techniques include automation and process control, and operate over an extreme range of temperature, vibration, electrical and acoustic noise, humidity, and other environmental characteristics.

DETAILED DESCRIPTION

Communication within and across manufacturing or industrial environments can be difficult due to extreme temperatures, variant levels of dust, moisture, machine noise, chemical hazards, and more. Injected noise in an industrial environment may adversely impact communication reliability and quality in the environment.

Figure 1:
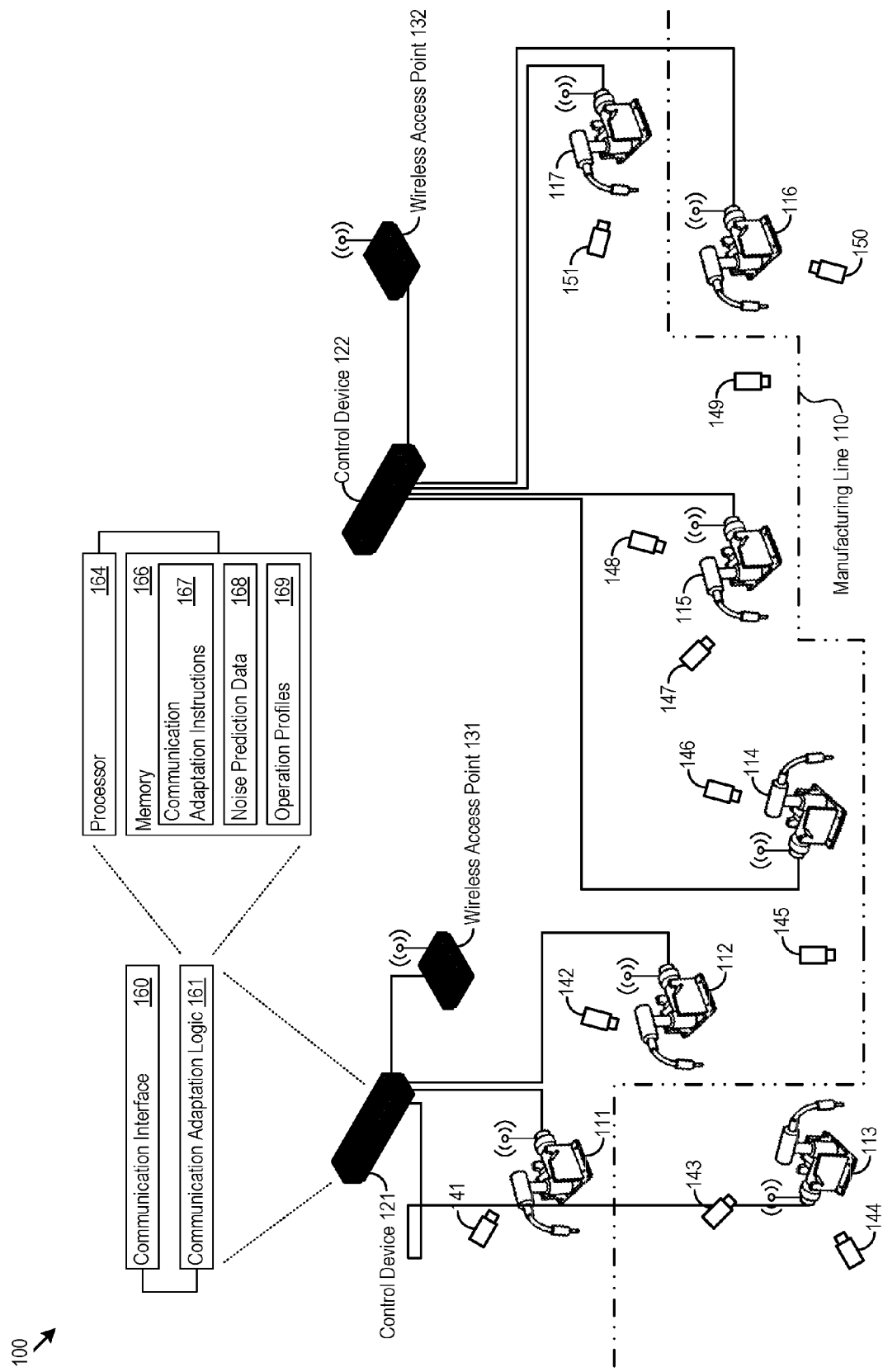
FIG. 1 shows an example of an environment that adapts communications to industrial noise.

FIG. 1 shows an example of an environment 100 that adapts communications to industrial noise. The environment 100 may be any industrial environment, such as a manufacturing assembly line, industrial materials processing plant, or factory inventory area. In particular, the environment 100 shown in FIG. 1 is an industrial environment that includes the manufacturing line 110. The environment 100 is not limited to industrial settings, however, and any environment in which the communication adaptations discussed below might be useful is a possibility, such as within a vehicle, a hospital, television broadcasting studio, or a classroom. The environment 100 may be include environments with periodic, predictable, or patterned noise characteristics, for example.

An environment 100 may include any number of devices. The exemplary industrial environment 100 in FIG. 1 includes manufacturing devices 111-117, control devices 121 and 122, wireless access points (AP) 131 and 132, and multiple sensors labeled as sensors 141-151. Additional or alternative devices may be present in the industrial environment 100, including as examples, network devices such as hubs, switches, routers, or bridges, data servers, actuators, generators, motors, machinery, monitoring devices, computers, management or control systems, environment management devices, analysis systems, communication devices, and any mobile device such as a mobile phone, tablet, and the like.

The manufacturing devices 111-117 are positioned along the manufacturing line 110. The manufacturing devices 111-117 may be implemented as any machinery, robotics, tooling, or other electronics that participate in an assembly (or de-assembly) process along the manufacturing line 110. The manufacturing devices 111-117 are communicatively linked to control devices, through which the manufacturing devices 111-117 receive control signals that monitor, guide, or control the manufacturing devices 111-117. In FIG. 1, the control device 121 is communicatively linked to the manufacturing devices 111-113 and the control device 122 is communicatively linked to the manufacturing devices 114-117. In some variations, the control device 121 is a programmable logic controller (PLC).

The sensors 141-151 may monitor various locations in the industrial environment 100. In FIG. 1, the sensors 141-151 are positioned at predetermined monitoring locations along the manufacturing line 110 and proximate to the manufacturing devices 111-117. The sensors 141-151 may capture environment data for monitoring the environment 100, such as visual data, audio data, temperature data, positional or movement data, or any other environment data indicative of a characteristic of the industrial environment 100. The sensors 141-151 may communicate captured data to any device in the industrial environment 100, an analysis system, or a monitoring system.

The industrial environment 100 supports multiple communication links between any of the devices within and/or outside the industrial environment 100. The multiple communication links may provide redundancy or failover capabilities between the communicating devices. As one such example shown in FIG. 1, the control device 121 is linked to the manufacturing device 111 through both a wired communication path (e.g., through a wired cable) and a wireless communication path (e.g., via the wireless access point 131). The manufacturing devices 111-117, in that regard, may communicate across multiple technologies, including any number of wired technologies and/or wireless technologies.

A device in the industrial environment 100 may include a communication interface that supports multiple communication links with other devices within or outside of the industrial environment 100. A communication interface may be configured to communicate according to one or more communication modes, e.g., according to various communication techniques, standards, protocols, or across various networks or topologies. The communication interface may support communication according to particular quality-of-service (QoS) techniques, encoding formats, through various physical (PHY) interfaces, and more. For example, a communication interface may communicate according to any of the following network technologies, topologies, mediums, protocols, or standards: Ethernet including Industrial Ethernet, any open or proprietary industrial communication protocols, cable (e.g. DOCSIS), DSL, Multimedia over Coax Alliance (MoCA), power line (e.g. HomePlug AV), Ethernet Passive Optical Network (EPON), Gigabit Passive Optical Network (GPON), any number of cellular standards (e.g., 2G, 3G, Universal Mobile Telecommunications System (UMTS), GSM® Association, Long Term Evolution (LTE)™, or more), WiFi (including 802.11 a/b/g/n/ac), WiMAX, Bluetooth, WiGig (e.g., 802.11ad), and any other wired or wireless technology or protocol. The control device 121, as one example, includes the communication interface 160.

A device in the environment 100 may include communication adaptation logic for adapting communications in the environment 100. Communication adaptation logic may support communication adaptations in response to industrial noise injected to the industrial environment 100. In FIG. 1, the control device 121 includes the communication adaptation logic 161. The communication adaptation logic 161 may be implemented in hardware, software, or both. The communication adaptation logic 161 may be implemented, for example, in a system on a chip (SoC), application specific integrated circuit (ASIC), or other circuitry in the control device 121.

In some implementations, the communication adaptation logic 161 includes one or more processors 164 and memories 166. The memory 166 stores, for example, communication adaptation instructions 167 (e.g., program instructions) that the processor 164 executes to carry out any of the adaptation features described below. The memory 166 may also store noise prediction data 168 and operation profiles 169. The noise prediction data 168 may indicate predicted noise for one or more portions (e.g., locations) of the environment 100. The operation profiles 169 may specify particular communication parameters or configurations for communicating in the industrial environment 100. As described in greater detail below, the communication adaptation logic 161 may adapt communications to account for industrial noise in the environment 100. The communication adaptation logic 161 may identify an adaptation trigger and in response, adapt a communication in the environment 100. The adaptation trigger may be reactive (e.g., upon detecting noise occurrence), predictive (based on predicted noise injection at a future time), or a combination of both. In response to identifying an adaptation trigger, the communication adaptation logic 161 may adapt a subsequent communication, for example to account for the predicted noise in the environment 100 during an impacted time period.

Figure 2:
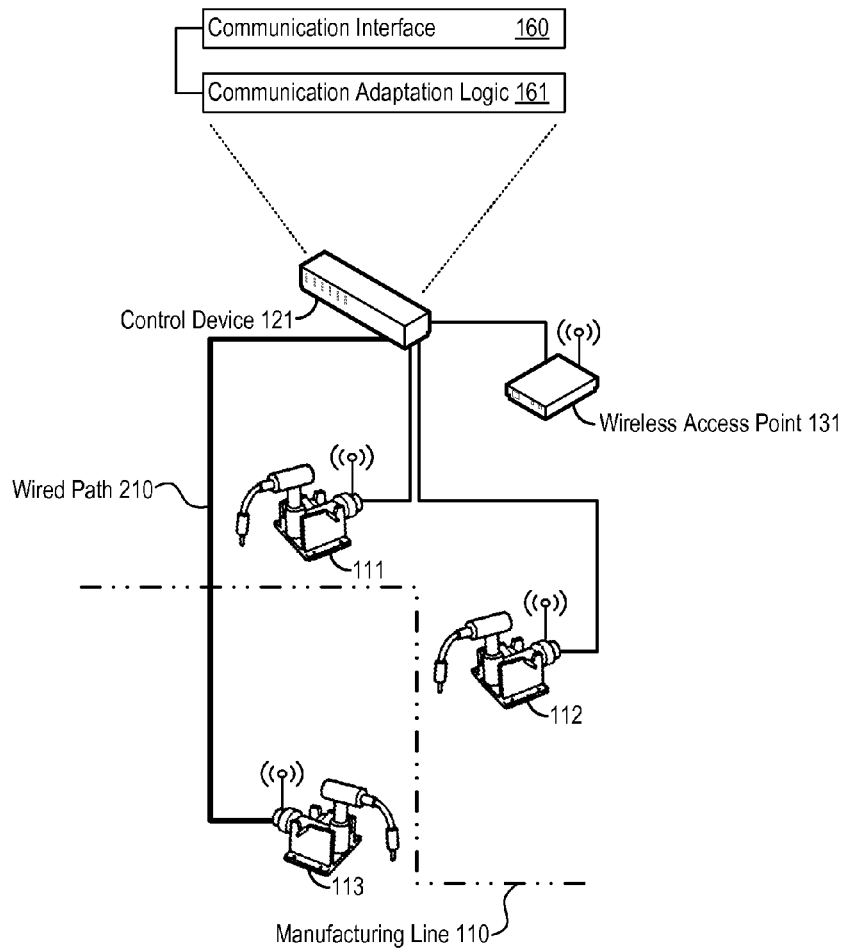
FIG. 2 shows an example of communication adaptation for a wired communication path.
Figure 2:
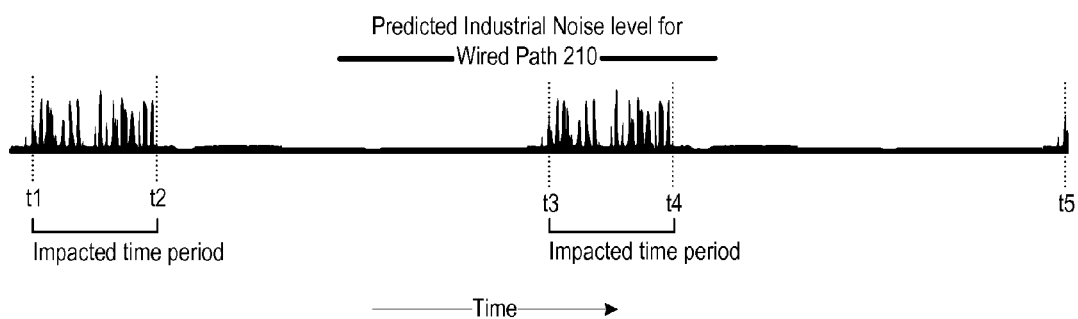

FIG. 2 shows an example of a communication adaptation for a wired communication path. In FIG. 2, the control device 121 is communicatively linked to the manufacturing device 113 through the wired path 210. The wired path 210 may be a copper or optical line, for example. The wired path 210 supports communications between the control device 121 and the manufacturing device 113 according to any wired communication technology. The control device 121 may be additionally linked to the manufacturing device 113 through one or more additional wired links (e.g., an additional wired line positioned along a different path in the industrial environment 100), one or more wireless links (e.g., a direct wireless link or through the wireless access point 131), or combinations of both.

The communication adaptation logic 161 identifies an adaptation trigger, which may be particular to a communication path or particular to set of communicating devices in the industrial environment 100. That is, the communication adaptation logic 161 may determine an adaptation trigger specific to the wired path 210 between the control device 121 and the manufacturing device 113.

The communication adaptation logic 161 may apply any number of trigger criteria in identifying the adaptation trigger. Exemplary trigger criteria include identifying an adaptation trigger when a noise level along the wired path 210 exceeds a trigger threshold, e.g., a predetermined decibel (dB) threshold, distortion level, or signal to noise (SNR) ratio threshold. Additional examples of trigger criteria include exceeding a signal interference ratio or amount, spectral overlap of interference and a communication path, physical impairments (e.g., resulting from periodic temperature or load applied to one or more devices in the environment 100). The adaptation trigger may specifically apply to a frequency spectrum used by the communication path or to noise effects specifically affecting the communication using a particular technology along a particular path or geo-location in the industrial environment 100.

The communication adaptation logic 161 may determine a reactive adaptation trigger. A reactive adaptation trigger may refer to an adaptation trigger determined when real-time or actual environment characteristics, e.g., real-time injected noise, meets the trigger criteria. The communication adaptation logic 161 may determine a predictive adaptation trigger. A predictive adaptation trigger may refer to an adaptation trigger determined when predicted environment characteristics will meet the trigger criteria at a subsequent (e.g., future) point in time. Put another way, the communication adaptation logic 161 may determine a predictive adaptation trigger when identifying a future time or time period when the trigger criteria will be satisfied.

The communication adaptation logic 161 may determine a predictive adaptation trigger using noise prediction data 168 that specifies predicted noise along the wired path 210 for a future time period. Noise levels in an industrial environment 100 may be particularly suited for noise prediction based on the repetitive nature of manufacturing and industrial processes. The manufacturing devices 111 or 112 may inject noise into the environment in a consistent, periodic manner such that the impact of the injected noise on the wired path 210 may be characterized in the noise prediction data 168. Accordingly, the communication adaptation logic 161 may predict when subsequent time periods when the injected noise adversely impacts communications across the wired path 210. These consistent, repetitive characteristics of noise injection in the industrial environment 100 allow the communication adaptation logic 161 to identify predictive adaptation triggers and adapt accordingly.

FIG. 2 illustrates an example of noise prediction data 168, specifically as predicted industrial noise levels for the wired path 210 as a function of time. The communication adaptation logic 161 may analyze the noise prediction data 168 to determine predictive adaptation triggers. As examples, the communication adaptation logic 161 may determine when a predicted noise level for the wired path 210 exceeds a predetermined noise or SNR threshold or when an average noise level or SNR over a period of time exceeds a predetermined threshold.

The communication adaptation logic 161 may determine one or more impacted time periods associated with an adaptation trigger. An impacted time period may refer to a time period when communicating across a particular path (e.g., the wired path 210) and/or using a particular communication technology will be impacted by the predicted noise, e.g., beyond a particular impact threshold measured in distortion, quality degradation, noise level, SNR, or according any other metric. The impacted time period may occur in the future, and indicate when the impact of predicted noise exceeds a particular threshold measured according to any threshold metric. The exemplary noise prediction data 168 in FIG. 2 includes two impacted time periods that the communication adaptation logic 161 may determine for the wired path 210. That is, the communication adaptation logic 161 may determine an impacted time period between time t1 and t2 and between time t3 and t4 when the average predicted noise level for the wired path 210 exceeds a predetermined noise threshold. Thus, using noise prediction data 168, the communication adaptation logic 161 may determine an impacted time period that occurs in the future. Accordingly, the communication adaptation logic 161 may identify a predictive adaptation trigger and a corresponding impacted time period by analyzing the noise prediction data 168.

In some variations, the communication adaptation logic 161 may identify a predictive adaptation trigger by analyzing control signaling in the industrial environment 100. The communication adaptation logic 161 may analyze a packet flow including control packets destined for one or more devices in the industrial environment 100. In doing so, the communication adaptation logic 161 may determine predicted (e.g., future) noise that may result from a control packet being sent to a particular noise-generating device in the industrial environment 100. To illustrate, the communication adaptation logic 161 may identify a control packet that causes the manufacturing device 111 to perform a particular function that injects noise, stops noise, or alters the degree of noise injected by the manufacturing device 111 into the industrial environment 100. The communication adaptation logic 161 may then determine a predictive adaptation trigger caused by injected or increased noise when the manufacturing device 111 performs the function specified in the control packet. The adaptation trigger may be predictive in that the communication adaptation logic 161 may identify a future time when the adaptation criteria will be met. The future time of the impacted time period may account for latency attributable to any combination of latency in the control device 121 sending the control packet, network latency in communicating control packet, and latency in the manufacturing device 111 processing and effectuating the received control packet (e.g., by performing the function specified by the control packet). In some variations, the communication adaptation logic 161 may determine a predictive adaptation trigger for the wired path 210 in response to identifying a control packet sent to the manufacturing device 113 itself.

As another example, the communication adaptation logic 161 may identify an adaptation trigger by identifying a portion of a sequenced communication flow, e.g., sequence of packets. Control signaling in an industrial environment 100 may be sequenced (e.g., sent sequentially to machinery devices at the front, middle, and end of a production line). Additionally, control signaling in an industrial environment 100 may be repetitive. The packet sequence may include a particular set of destination devices in the environment 100 sent at particular, consistent time intervals. In that regard, the communication adaptation logic 161 may analyze packet headers to determine time-stamping and destination of packets and, in some variations, identify an adaptation trigger without having to analyze the packet content (e.g., payload). The communication adaptation logic 161 may identify an adaptation trigger, for example, in response to identifying a first packet or set of packets that match in common to the start of a particular packet sequence. In that regard, the communication adaptation logic 161 may predict a future sequence of packets that will cause noise injection into the industrial environment 100 (e.g., predicting subsequent packets sent to machinery at later point in the manufacturing line 110). In this scenario, the communication adaptation logic 161 may identify an adaptation trigger for a packet flow without having to determine that the packet flow specifies control signaling.

The communication adaptation logic 161 may determine a reactive or predictive adaptation trigger using sensor data. In that regard, the communication adaptation logic 161 may identify specific sensor data that corresponds with a subsequent noise change. The sensor data may include a particular detected motion or series of movements by one of the manufacturing devices 111-117, which the communication adaptation logic 161 may associate with a particular noise injection or change. As such, the communication adaptation logic 161 may determine the impact of noise level on a particular communication path or other portion of the environment 100 using the sensor data. As an industrial environment 100 may include repetitive movement of machinery or other manufacturing devices, the communication adaptation logic 161 may identify determine a predicted or future impact on noise levels using sensor data.

As one illustration, the communication adaptation logic 161 may determine that particular movement data for a manufacturing device is associated with noise injection from the manufacturing device at a subsequent, predicted time. As another illustration, the communication adaptation logic 161 may identify a particular movement by the manufacturing device 111 at a head of the manufacturing line 110, which may correspond to a particular processing function performed by the manufacturing device 111 on a product, for example. The communication adaptation logic 161 may predict subsequent noise injection at a later point in the manufacturing line 110 from a manufacturing device 116 for performing a subsequent processing function on the product, e.g., at a particular consistent time after the manufacturing device 111 performs its specific function. Accordingly, the communication adaptation logic 161 may determine a predictive adaptation trigger using, for example, visual sensor data of the manufacturing device 111 at the head of the manufacturing line 110. Optionally, the noise prediction data 168 may map associations between visual, audio, or other sensed data and resultant noise injection.

In response to identifying an adaptation trigger, the communication adaptation logic 161 performs a communication adaptation. The communication adaptation logic 161 may adapt a subsequent communication to account for a detected and/or predicted noise along the wired path 210. For a predictive adaptation trigger, the communication adaptation logic 161 may perform the communication adaptation at a subsequent time, such as during a future impacted timed period predicted to occur using noise prediction data 168.

The communication adaptation logic 161 may, as one example of a communication adaptation, send a subsequent communication using a different communication path or communication technology. In FIG. 2, the communication adaptation logic 161 may perform a communication adaptation by sending a wireless communication to the manufacturing device 113 through a direct wireless connection or via the wireless AP 131 and instead of through the wired path 210. The communication adaptation logic 161 may select a different communication path or technology that meets any number of selection criteria, such as selecting the path or technology least affected by industrial noise during the impacted time period associated with the adaptation trigger.

As another example of a communication adaptation, the communication adaptation logic 161 may burst communication to the manufacturing device 113 through the wired path 210. The communication adaptation logic 161 may determine a burst period that occurs prior to the impacted time period. To burst communications during the burst period, the communication adaptation logic 161 may elevate the priority of data (e.g. packet flow) destined for the manufacturing device 113, such as through adjusting of one or more queue priorities, adjusting cache or other memory allocations, preempting traffic sent to other devices, or taking other action to expedite sending of a packet flow to the manufacturing device 113 before the impacted time period occurs. As yet another example of a communication adaptation, the communication adaptation logic 161 may cease communication specifically across the wired path 210 in response to the adaptation trigger, e.g., ceasing communications across the wired path 210 during the impacted period and resuming communication after the impacted time period elapses.

As yet another example, the communication adaptation logic 161 may offload a portion of the communications sent to the manufacturing device 113 to other communication methods or technologies. Doing so may account for the detected or predicted noise impacting communications sent through the wired path 210. That is, the communication adaptation logic 161 may cause the control device 121 to communicate simultaneously across multiple communication technologies, e.g., in part through the wired path 210 and in part through a wireless technology. The communication adaptation logic 161 may adjust encoding techniques, resource allocation, and other communication parameters to support the simultaneous communication, which may be redundant or non-redundant.

The communication adaptation logic 161 may perform a communication adaptation by operating according to a different operation profile 169. The operation profiles 169 may specify different communication settings, characteristics, and configurations for communicating data. The communication adaptation logic 161 may select a different operation profile 169 for communicating with the manufacturing device 113 in response to identifying the adaptation trigger. Operating according to one of the operation profiles 169 may implement or effectuate any of the communication adaptations described above or below.

Figure 3:
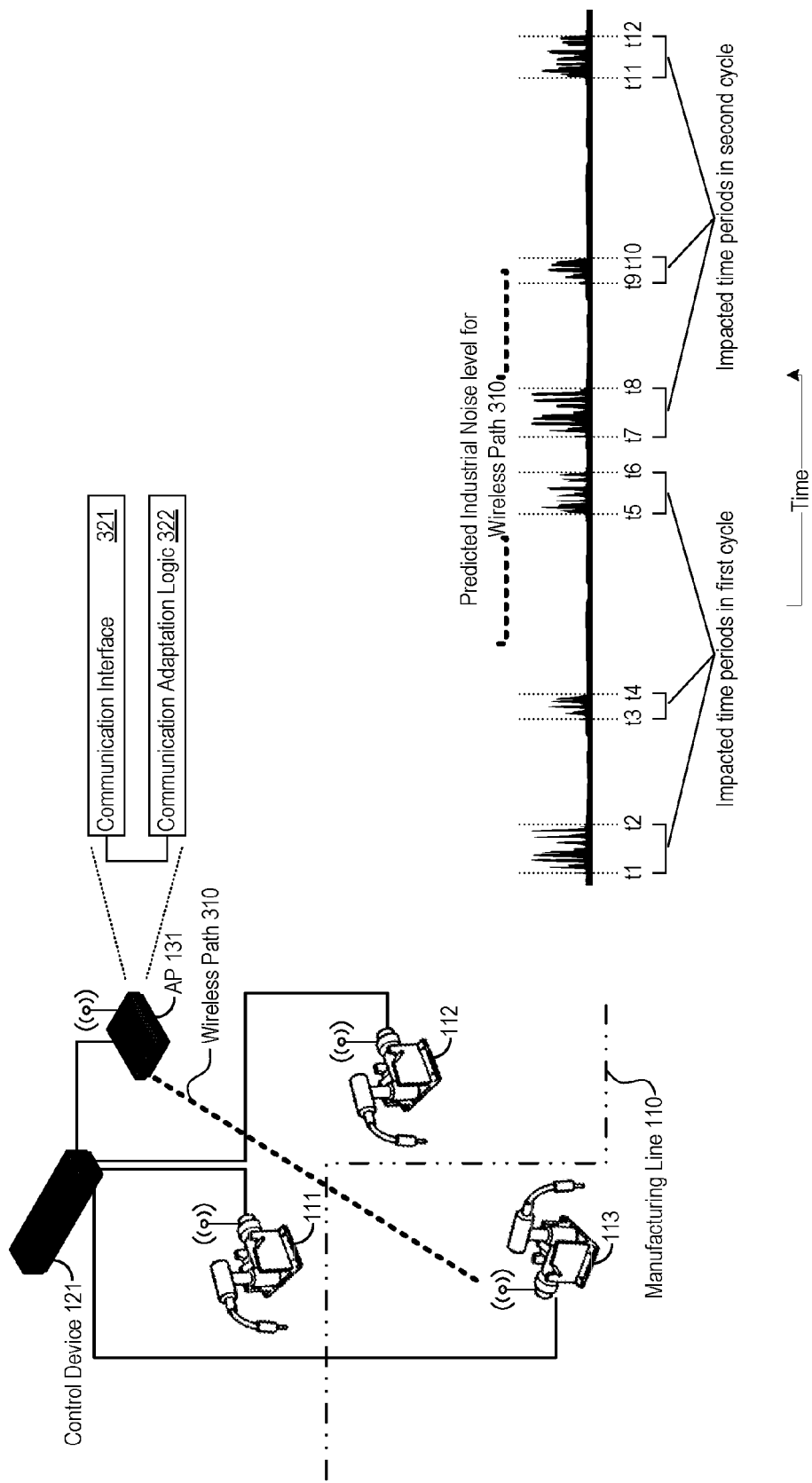
FIG. 3 shows an example of communication adaptation for a wireless communication path.

FIG. 3 shows an example of communication adaptation for a wireless communication path. In FIG. 3, the wireless access point 131 communicates with the manufacturing device 113 through a wireless communication path 310. The wireless communication path 310 in FIG. 3 is illustrative, and generally represents wireless communications between the access point 131 and the manufacturing device 113, which may traverse in various directions and across various portions or locations of the environment 100. The wireless access point 131 may include a communication interface 321 and communication adaptation logic 322. The communication interface 321 may support wireless communications according to multiple radio access technologies (RAT), such as any 802.11 technology, WiGig or any 60 GHz wireless technologies, LTE, Bluetooth, etc.

The communication adaptation logic 322 may cause the access point 131 to send a wireless communication to the manufacturing device 113 using a first wireless technology. The communication adaptation logic 322 may identify an adaptation trigger in any of the ways discussed above, and particularly for communications with the manufacturing device 113 using the first wireless technology and across the wireless communication path 310. The communication adaptation logic 322 may determine one or more impacted time periods associated with the adaptation trigger, including future/predicted impacted time periods when communications using the first wireless technology along the wireless communication path 310 will be adversely impacted by predicted industrial noise injection.

The communication adaptation logic 322 may access noise prediction data 168, which may specify predicted industrial noise levels for the wireless path 310 as a function of time. FIG. 3 illustrates an example of predicted noise levels that may be specified in the noise prediction data 168. The predicted noise level for the wireless communication path 310 may exhibit periodic attributes, as seen in FIG. 3. Analyzing the noise prediction data 168, the communication adaptation logic 322 may identify multiple impacted time periods across multiple periodic noise cycles that satisfy the trigger criteria, and accordingly identify one or more adaptation triggers (e.g., predictive adaptation triggers for each of the impacted time periods).

In response to identifying an adaptation trigger, the communication adaptation logic 322 may adapt a subsequent communication sent to the manufacturing device 113. The communication adaptation logic 322 may perform any of the communication adaptations discussed above. The communication adaptation logic 161 may, as another example of a communication adaptation, use the same wireless technology (e.g., same RAT) for sending the subsequent communication, but select a cleaner communication channel or frequency band within the RAT. The communication adaptation logic 322 may identify any number of possible communication channels to switch to using the noise prediction data 168, captured channel data such as data captured using any number of sounding techniques, measuring distortion levels from restored signals of known tones, performing spectrum analysis, or via processing any other data indicative of a noise level for frequency bands of a particular RAT. Optionally, the communication adaptation logic 322 may offload a subsequent communication, in whole or in part, to different wireless technologies. As another option, the communication adaptation logic 322 may offload sending of the subsequent communication through a wired path, e.g., the wired path 210.

During an impacted time period, the communication adaptation logic 322 may adapt communication resources in the wireless access point 131 to simultaneously communicate across multiple wireless technologies. In any of the examples above, the communication adaptation logic 322 may reallocate or divide packet flow among selected RATs through which to send subsequent communications during an impacted time period.

As another example of a communication adaptation, the communication adaptation logic 322 may handover the subsequent communication, in part or in whole, to another access point (e.g., the wireless access point 132). The communication adaptation logic 322 may indicate handover to the wireless access point 132 for communicating data to the manufacturing device 113 during an impacted time period for the wireless access point 131. As yet other examples of communication adaptations, the communication adaptation logic 322 may adjust (e.g., reduce) throughput during the impacted time period, use enhanced encoding techniques, or utilize packet retransmission to increase the robustness of sending the subsequent communication through the same wireless RAT impacted by the actual or predicted industrial noise.

As discussed above, the communication adaptation logic 322 may select a particular operation profile 169 in response to identifying a trigger adaptation. Operating according to the particular operation profile 169 may adjust one or more communication configurations for the wireless access point 131 to account for the actual or predicted noise associated with an identified adaptation trigger.

Figure 4:
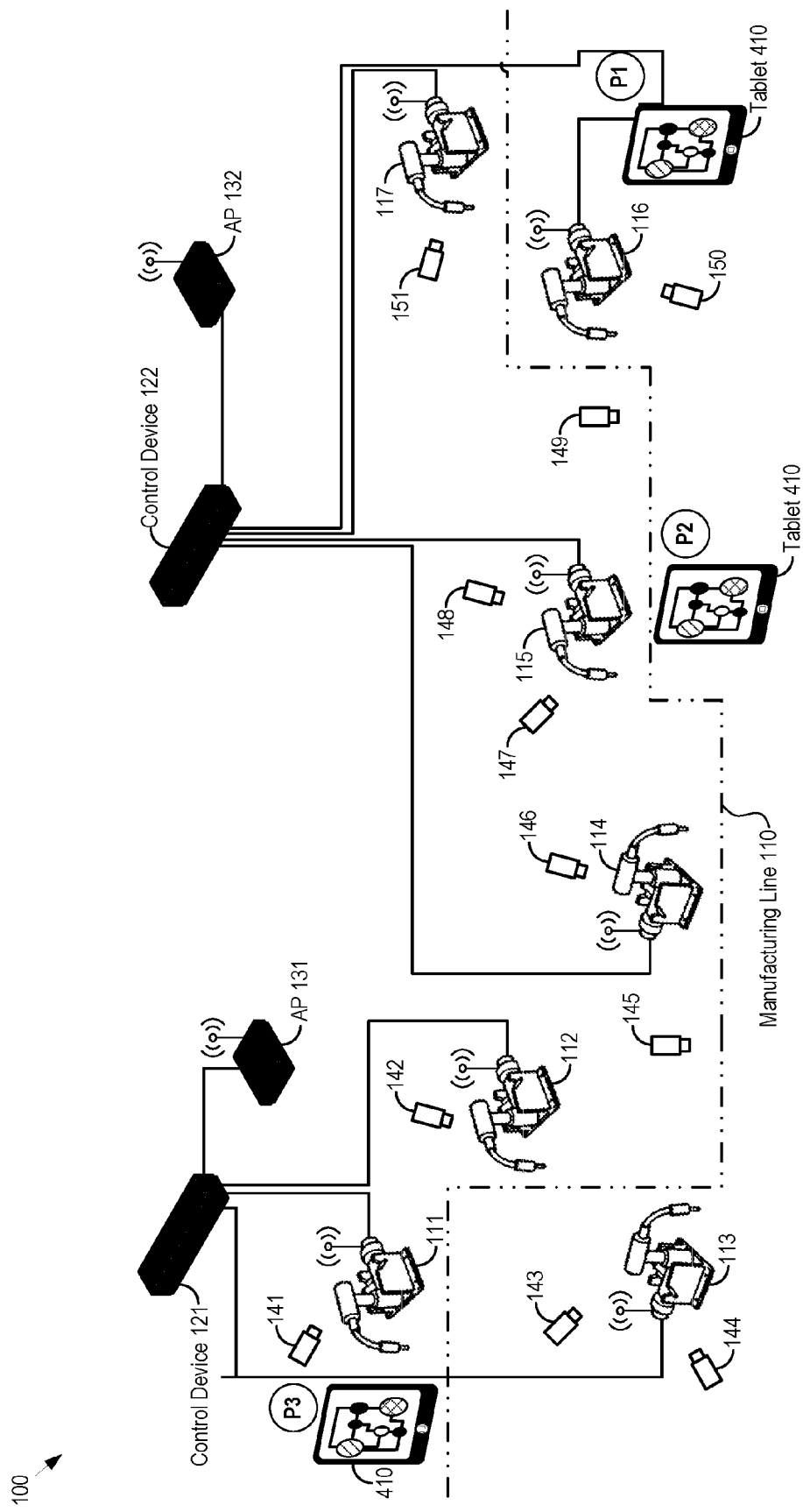
FIG. 4 shows an example of adapting communications sent to a mobile device.

FIG. 4 shows an example of adapting communications sent to a mobile device. In particular, FIG. 4 shows a tablet device 410 positioned at various positions in an industrial environment 100. For example, a technician may use the tablet device 410 (or any other mobile device) in assessing various positions of the manufacturing line 110, such as the positions labeled as P1, P2, and P3 in FIG. 4. The tablet 410 may wirelessly receive data from one or more devices in the environment 100, such as sensor data from one or more of the sensors 141-151. The tablet 410 may additionally or alternatively communicate with other devices in the environment, such as any of the manufacturing devices 111-117, control devices 121 and 122, or others.

The tablet 410 or other devices in the environment 100 may implement communication adaptation logic for adapting wireless communications to account for detected or predicted industrial noise. One example is presented with respect to sensor 148, which may wireless transmit sensor data to the tablet 410. The sensor 148 may receive positional data from the tablet 410, such as geo-positional data indicative of a position of the tablet 410 in the environment 100. Communication adaptation logic of the sensor 148 may adapt communications to the tablet 410 to account for the position of the tablet in the environment 100. That is, the sensor may access noise prediction data 168 to identify predicted noise specifically affecting a respective wireless path between the tablet 410 at positions P1, P2, P3, or any other geo-position of the tablet 410. The sensor 148 may identify adaptation triggers and adjust subsequent communications to the tablet 410 in any of the ways described herein.

Any number of devices may implement communication adaptation logic. In that regard, communication adaptation logic may adapt communications between any two devices communicating in the industrial environment 100, whether implemented in one or both of the communicating devices. In some embodiments, a management system implements the communication adaptation logic to centrally manage communications in the industrial environment 100. The management system may determine adaptation triggers for one or more of the devices in the environment 100 and send control signals to the devices whose communications are or will be affected by identified or predicted industrial noise. The devices may locally store operation profiles 169 and select a particular operation profile 169 based on the control signals received from the management system.

Figure 5:
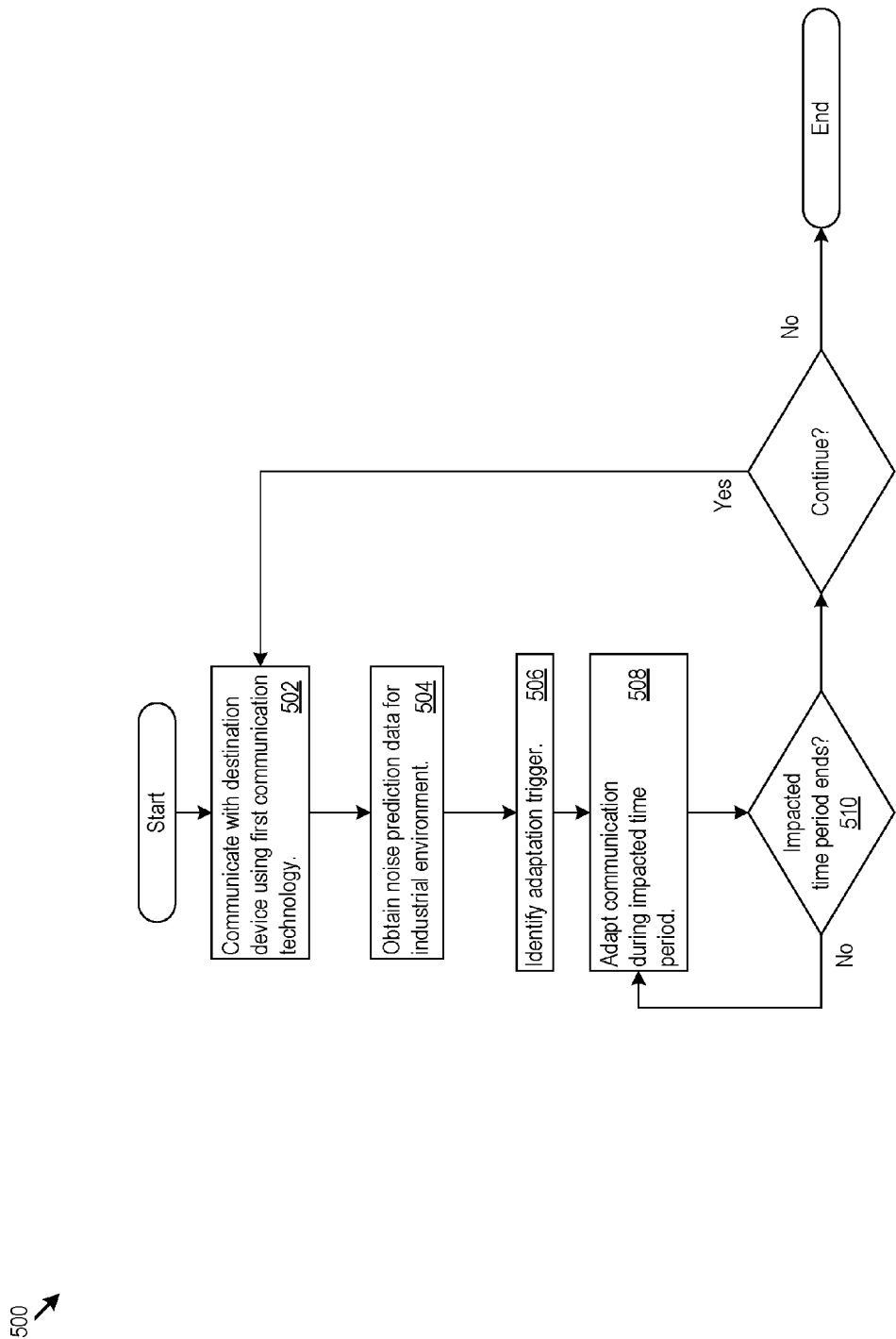
FIG. 5 shows an example of logic that a device may implement for adapting communication to industrial noise.

FIG. 5 shows an example of logic 500 that a device in an industrial environment 100 may implement. Communication adaptation logic, such as the communication adaptation logic 161 or 322, may implement the logic 500 in hardware, software, or both. For example, the communication adaptation logic 161 may implement the logic 500 in software as the communication adaptation instructions 167.

The communication adaptation logic 161 communicates with a destination device using a first communication technology (502). The first communication technology may be a wired technology or wireless technology supported by a communication interface of the device implementing the communication adaptation logic. The communication adaptation logic 161 may communicate with the destination device, for example, using a first operation profile 169 that specifies any configuration or parameter associated with using the first communication technology to communicate with the destination device.

The communication adaptation logic 161 may obtain noise prediction data 168 for the industrial environment 100 (504). The noise prediction data 168 may indicate predicted noise levels for the industrial environment 100. In some variations, the communication adaptation logic 161 accesses the noise prediction data 168 from a memory, locally or remotely. The communication adaptation logic 161 may specifically access noise prediction data 168 identifying the impact of predicted industrial noise for a communication path to the destination device using the first communication technology. For example, the communication adaptation logic 161 may access specific geo-coded portions of the noise prediction data 168 corresponding to a particular communication path for communicating with the destination device using the first communication technology. The noise prediction data 168 may indicate predicted noise specific to a frequency band or communication channel used by the first communication technology along the communication path.

The noise prediction data 168 may be generated by the communication adaptation logic 161 or, for example, an analysis system. The analysis system may collect noise data for some or all of the devices in the environment 100. Such noise data may include positional data for a particular device in the industrial environment 100 (e.g., any of the manufacturing devices 111-117) as well as a characterization of the noise injected by the particular device during operation. For example, the analysis system may collect sound samples of noised injected by a manufacturing device 111-117 during an initial configuration or routine operation of the device. The analysis system may analyze the injected sound to determine its effect on any number of the communication technologies, particularly those supported by devices in the environment 100.

The analysis system may also determine timing characteristics of the injected noise for a particular device in the environment 100. Taking advantage of the repetitive nature of industrial manufacturing devices, the analysis system may determine a periodicity for the injected noise of particular device. The analysis system may use the positional data of the particular device and noise characterization (including periodic timing characteristics) for generating a noise impact topology map, which may be one example of the noise prediction data 168. The noise impact topology map may account for noise injection for all of the devices in the environment 100 and may take the form of a heat map.

In some implementations, the analysis system may additionally or alternatively determine noise prediction data 168 based on sensor data collected by one or more sensors in the environment 100. The sensor data may indicate noise levels at a particular location of the sensor. The analysis system may analyze the sensor data, which may be represented as a histogram or other data structure. For example, the analysis system may perform Fourier analysis to determine whether particular sensed noise is periodic in nature. If so, the analysis system may include the impact of the particular periodic sensed noise in the noise prediction data 168. In some variations, communication adaptation logic performs some or all of the noise prediction data determination methods discussed above. In some variations, multiple devices in the environment 100 may collectively determine, supplement, or update the noise prediction data 168.

Returning to the exemplary logic 500, the communication adaptation logic 161 may identify an adaptation trigger (506). The adaptation trigger may be particular to the communication path to the destination device using the first communication technology. The adaptation trigger may correspond to, for example, injection of noise into environment 100 by one or more devices, the result of which affects communications between the device implementing the communication adaptation logic 161 and the destination device. As discussed above, the adaptation trigger may be predictive or reactive.

An impacted time period may correspond with the adaptation trigger. The communication adaptation logic 161 may determine the impacted time period as, for example, a time period where communicating with the destination device using the first communication technology would be impacted by predicted noise specified in the noise prediction data 168 and in excess of a predetermined threshold. For a reactive adaptation trigger, the communication adaptation logic 161 may identify the impacted time period as the time period from when the detected noise affecting communications with the destination device meets a trigger criteria until the detected noise no longer meets the trigger criteria (e.g., when the detected noise no longer occurs).

In response to identifying the adaptation trigger, the communication adaptation logic 161 may perform a communication adaptation. The communication adaptation logic 161 may adapt subsequent communication to the destination device during the impacted time period (508), e.g., in any of the ways discussed above or below. For example, the communication adaptation logic 161 may select a different operation profile 169 to communicate according to, in response to identifying the adaptation trigger. As another example, the communication adaptation logic 161 may analyze the noise characteristics of the injected or predicted noise and adapt communication (e.g., signal processing) of signals communicated during the impacted time period. Such noise characteristics may include the extracting the power spectrum or other characteristics of the noise and adaptively filtering noise from signals communicated using the first communication technology during the impacted time period. The communication adaptation logic 161 may perform the communication adaptation during the impacted time period. At the end of the impacted time period (510), the communication adaptation logic 161 may optionally resume communication using the first communication technology.

Figure 6:
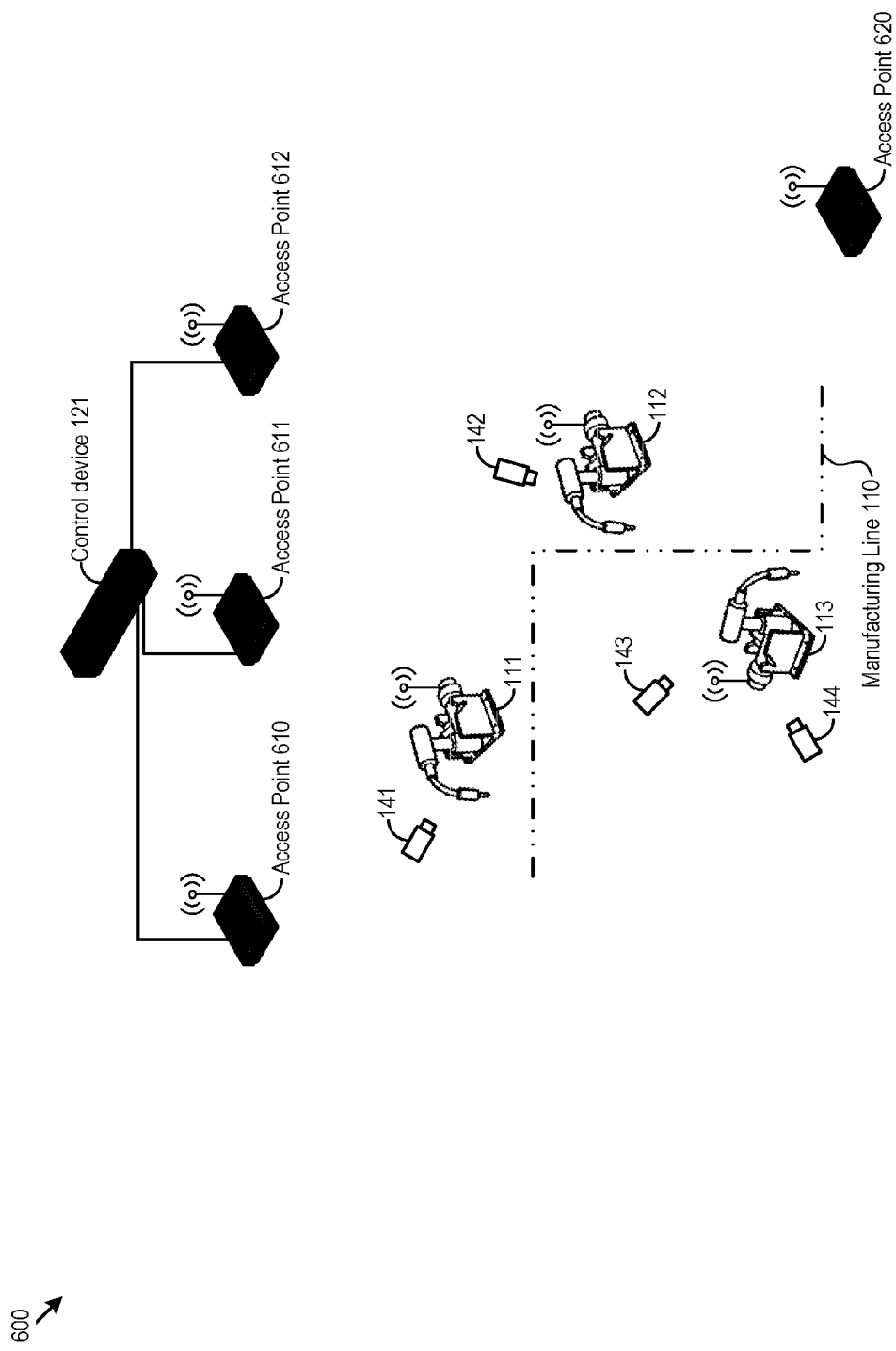
FIG. 6 shows an example of an architecture that supports coordinated adaption among multiple devices in an industrial environment.

FIG. 6 shows an example of an architecture 600 that supports coordinated adaption among multiple devices in an industrial environment 100. In that regard, devices in an industrial environment 100 may communicate through multiple different communication pathways, each of which may utilize different communication resources and/or devices. In the exemplary architecture 600, the control device 121 may communicate with the manufacturing device 113 through multiple communication pathways. In particular, the control device 121 is linked to the multiple access points labeled as access point 610, access point 611, and access point 612 through which the control device 121 may send a wireless communication to the manufacturing device 113 or other devices in the industrial environment 100. The communication pathways are redundant in that control device 121 may transmit the same packet flow through some or all of the access points 610-612. Some coordinate adaptation examples are provided below with respect to access points 610-612, which may be performed any device or sets of devices in an industrial environment 100.

The access points 610-612 may operate independently, but coordinate to adaptively respond to industrial noise in the environment 100. In particular, the access points 610-612 may coordinate communication configurations and parameters to support payload delivery sharing. Each of the access points 610-612 may implement communication adaptation logic to adaptively respond to detected or predicted industrial noise or other variances in the environment 100 that may affect the quality and effectiveness of communication in the industrial environment 100, including any of the methods or processing described below.

As one example, the access points 610-612 may coordinate beamforming parameters to redundantly deliver packet flow to a destination device. To illustrate, the access point 610 may perform beamforming or spatial filtering to direct a packet flow sent from the control device 121 to a destination device, such as the manufacturing device 113. Access point 612 may also perform beamforming to direct the same packet flow to the manufacturing device 113. As access points 610 and 612 are positioned at different locations in the environment, redundantly communicating through both access points 610 and 612 may increase the effectiveness of sending the packet flow to a destination device depending on the respective paths between the access points 610 and 612 and the destination device. Access point 611 may provide wide beam or omnidirectional transmissions of the same packet flow, providing additional redundancy in sending the packet flow to the manufacturing device 113.

Any of the access points 610-612 may perform communication adaptions in response to identifying an adaptation trigger. An access point may adjust a beamforming configuration in response to predicted industrial noise during an impacted period that may affect the effectiveness of beamforming communications with the destination device. The access point may, for example, transition to a multiple-input-multiple-output (MIMO) configuration in response to the adaptation trigger. The access points may schedule beamforming during quiet periods when the predicted noise for the environment 100 specifically along a beamforming communication pathway falls below a noise or trigger threshold. During periods of increased noise along the pathway, the access point may employ interference cancellation, for example by injecting nulls into the packet flow, or perform beam scaling adjustments. As mentioned above, the access points may utilize a different radio access technology (RAT) with communication bands or spectrums that are unaffected or lesser affected by predicted noise along a wireless communication path to the destination device, e.g., as determined from the noise prediction data 168.

The access points 610-612 may utilize sensor data, including visual data, to adapt communications to a destination device. Adaptations based on sensed visual data may be particularly useful for wireless communication technologies affected by line of sight issues, such as 60 GHz technologies based on 802.11ad. In that regard, an access point 610-612 may analyze visual sensor data to determine a movement in machinery, devices, robotics, humans, or other objects that has or may result in blocking of a wireless communication pathway with a destination device. As one illustration, the access point 610 may adapt communications to the destination device by adjusting a communication configuration (e.g., transitioning to MIMO), utilizing a different RAT, or offloading communication with the destination device to a neighboring access point, such as access points 611 and 612.

The access points 610-612 may take advantage of the repetitive nature of industrial machinery to track and predict movements within the industrial environment. In that regard, the access points 610-612 may access predicted movement data indicative of predicted movements or positioning of objects in the industrial environment 100 as a function of time. The predicted movement data may allow the access points 610-612 or other communication adaptation logic to identify predictive adaptation triggers based on predicted location data of the objects and adapt communications accordingly. The access points 610-612 may also identify reactive adaptation triggers, e.g., by checking an impulse response and determining an environment change affecting a beam-formed communication. In adapting to an adaptation trigger, communication adaptations performed by the access points 610-612 may be independent (e.g., stand-alone adaptions by a single access point) or coordinated (e.g., offloading or transitioning of communication between various access points).

In some variations, a management system coordinates communications via the multiple redundant pathways in an environment 100. The access points 610-612 may receive control signals from the management system, and the control signals may coordinate multi-beam mapping and scheduling of communications among the access points 610-612. The coordination between the access points 610-612 and their respective communication paths may specify multiple redundant communications to the destination device or a single communication through an optimum communication pathway selected among the access points 610-612 based on analysis of noise prediction data 168, predicted movement data, real-time sensor data, or any other environment characteristic data.

Coordination among the access points 610-612 may vary according to any number of packet characteristics. For example, the access points 610-612 may each redundantly send a packet flow to a destination device when the packet flow exceeds a threshold priority level (e.g., for mission-critical packet flows). When a packet flow does not exceed the threshold priority level, the access points 610-612 may determine a selected access point for sending the packet flow based on the noise prediction data 168, predictive movement data, and the like. The selected access point may be determined according to selection criteria specifying selection of access point with a communication pathway to the destination device with a lowest amount of noise, lowest SNR, or according to any other quality metric for a communication pathway. The access point selection may be coordinated by a management system or through exchanged coordination communications between the access points 610-612. Selection of multiple access points is also possible, and communications through the multiple access point may be redundant (e.g., cloned packet flow) or non-redundant (e.g., packet flow divided between the multiple access points). In some scenarios, one or more of the access points 610-612 may perform a communication adaptation by offload communications, in whole or in part, to a wired communication link to the destination device.

The access points 610-612 may coordinate communications to a destination device. The destination device may be an endpoint device, such as the manufacturing device 113. As another option, destination device may be convergence node, such as the access point 620 in FIG. 6. A convergence node may support receiving multiple communications from the access points 610-612, including identifying redundant packet flows and/or reassembling non-redundant packet flows divided among multiple communication pathways. The convergence node may perform pathway queuing among the multiple pathways, processing, and failover processing, when needed.

Figure 7:
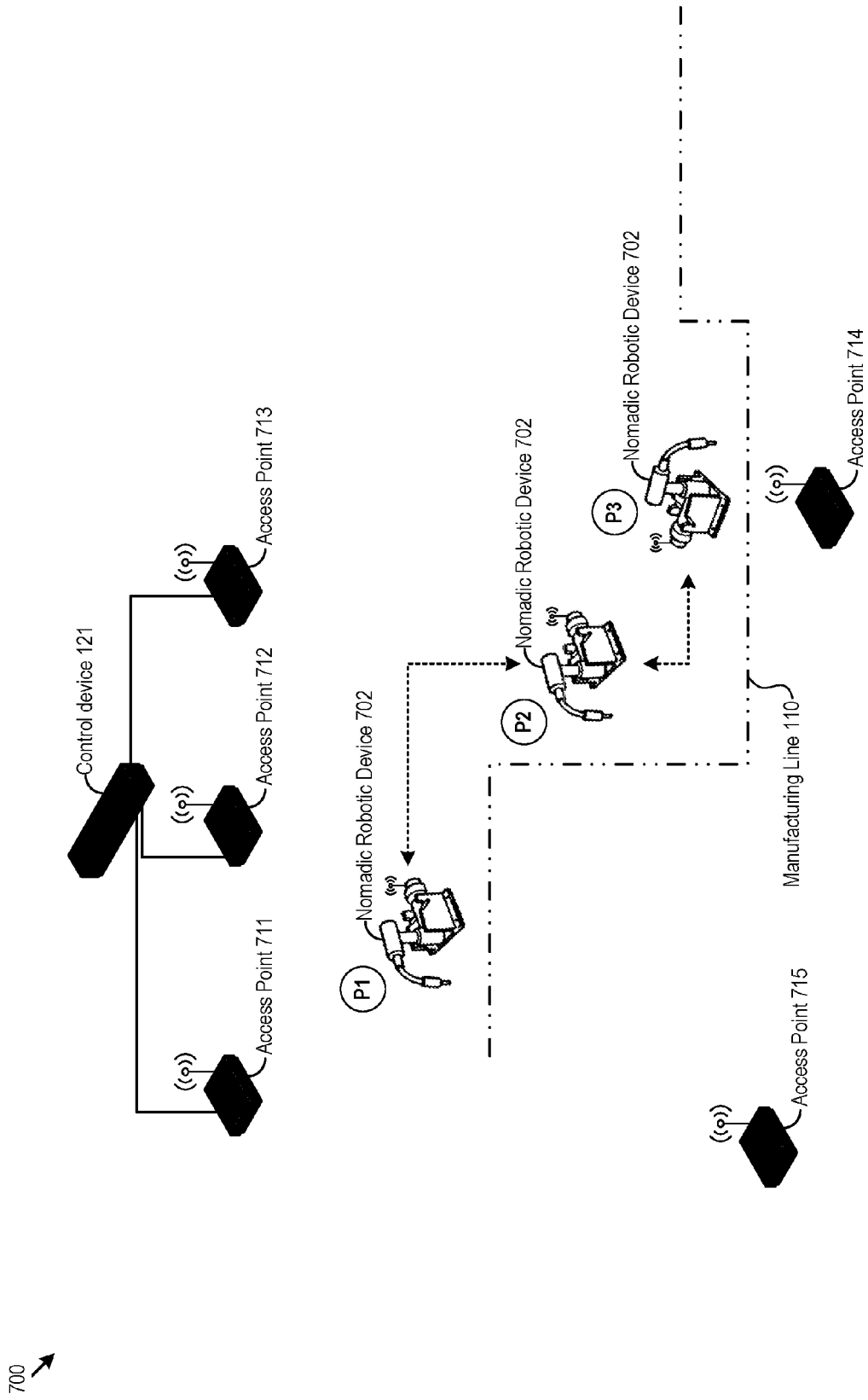
FIG. 7 shows an example of architecture in an industrial environment that supports wireless redundancy.

FIG. 7 shows an example of architecture 700 in an industrial environment 100 that supports wireless redundancy. In FIG. 7, a control device 121 is communicatively linked to multiple access points labeled as 711, 712, and 713. The architecture 700 includes the access points 714 and 715, which may be communicatively linked to other control devices or the control device 121. The multiple access points 711-715 may support redundant wireless communications to a destination device. The multiple access points 711-715 may additionally or alternatively coordinate to determine a selected subset of access points through which to communicate with a destination device to account for predicted noise, predicted movement, or other predicted and/or real-time characteristics of the industrial environment 100.

Coordinated wireless communications in an industrial environment 100 may be particularly useful in ensuring communication integrity for non-stationary devices. Examples of non-stationary devices include mobile devices, such as the tablet device 410 presented in FIG. 4, the nomadic robotic device 702 shown in FIG. 7, or other devices that are not tied to a particular location, such as mobile patient monitoring devices or carted medical equipment in a medical environment, mobile sensing devices, and more.

In FIG. 7, the nomadic robotic device 702 may traverse various positions along the manufacturing line 110 during an assembly process, including the positions labeled as P1, P2, and P3, e.g., along the dotted paths between positions P1, P2, and P3. Wireless communication to the nomadic robotic device 702 may be coordinated among the multiple access points 711-715 to account for predicted noise, sensed visual data, predicted movement data, or any other environment characteristics affected communication pathways to the nomadic robotic device 702

Along with any communication adaptations the multiple access points 711-715 may perform, redundancy through cloned packet flows sent by two or more of the multiple access points 711-715 may further increase the reliability and robustness of communications to the nomadic robotic device 702. Additionally, any of the access points 711-715 may redundantly send a packet flow via multiple wireless channels. Increased redundancy or robustness configurations may be utilized for high priority packet flows including flows that exceed a threshold priority level. Additional or alternative packet flow criteria include flows sent to a destination device with an increased priority (e.g., a medical treatment device where lost communications can result in medical complications or improper treatment of a patient) or flows sent from a source device with an increased priority.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

What is claimed is:

1. A method comprising:
   in a source device:
      sending a first communication to a destination device using a first wireless technology;
      accessing noise prediction data, established for a future functioning characteristic of a manufacturing device, the noise prediction data indicating predicted noise along a communication pathway from the source device to the destination device for the first wireless technology; and
      adapting a subsequent communication to the destination device to account for the predicted noise along the communication pathway arising from the future functioning characteristic of the manufacturing device.

2. The method of claim 1, where adapting the subsequent communication comprises:
   determining, responsive to the noise prediction data, an impacted time period where communication using the first wireless technology would be adversely affected by the predicted noise.

3. The method of claim 2, where adapting the subsequent communication further comprises:
   sending the subsequent communication to the destination device using a second wireless technology during the impacted time period.

4. The method of claim 2, where adapting the subsequent communication further comprises:
   determining a burst time period prior to the impacted time period; and
   bursting the subsequent communication to the destination device using the first wireless technology during the burst time period.

5. The method of claim 4, where bursting the subsequent communication comprises altering a queue priority so the subsequent communication is sent to the destination device at an elevated priority during the burst time period.

6. The method of claim 2, where adapting the subsequent communication further comprises:
   pausing communication with the destination device using the first wireless technology during the impacted time period.

7. The method of claim 1, further comprising:
   detecting a noise occurrence not indicated by the noise prediction data; and
   where adapting the subsequent communication to the destination device further accounts for the noise occurrence.

8. The method of claim 7, where adapting the subsequent communication to the destination device:
   determining that the noise occurrence would affect communication over a second wireless technology; and
   responsive to the noise occurrence, determining to send the subsequent communication to the destination device using the first wireless technology instead of the second wireless technology even though communicating with the destination device using the first wireless technology would be adversely affected by the predicted noise.

9. The method of claim 1, where adapting the subsequent communication to the destination device comprises:
   determining whether the predicted noise would exceed a noise threshold when the subsequent communication is scheduled to be sent; and
   when the predicted noise does not exceed the noise threshold:
      sending the subsequent communication to the destination device using the first wireless technology; and
   when the predicted noise exceeds the noise threshold:
      sending the subsequent communication to the destination device using a second wireless technology instead of the first wireless technology.

10. The method of claim 1, where adapting the subsequent communication to the destination device comprises:
    offloading a portion of the subsequent communication to a wired link to the destination device.

11. The method of claim 1, where adapting the subsequent communication to the destination device comprises:
    adjusting a beamforming configuration for a wireless communication interface of the source device; and
    after adjusting the beamforming configuration:
       sending the subsequent communication to the destination device using the wireless communication interface.

12. The method of claim 1, where adapting the subsequent communication to the destination device comprises:
    determining that the predicted noise will affect a particular frequency band used by the first wireless technology; and
    selecting a different frequency band for the subsequent communication.

13. A source device comprising:
    a memory configured to store:
       a first operational profile;
       a second operational profile; and
       noise prediction data established for a future functioning characteristic of a manufacturing device; and
    communication adaptation circuitry in data communication with the memory, the communication adaptation circuitry configured to:
       operate according to the first operational profile to send a first packet to a destination device;
       access the noise prediction data;
       determine, using the noise prediction data, an impacted time period when predicted noise arising from the future functioning characteristic manufacturing device affects network communication between the source device and the destination device;

select the second operational profile to account for the predicted noise during the impacted time period; and during the impacted time period:

operate according to the second operational profile to send a second packet to the destination device.

14. The source device of claim 13, where the second operational profile specifies sending the second packet to the destination device using a different communication technology than specified by the first operational profile.

15. The source device of claim 13, where the second operational profile specifies sending the second packet to the destination device using a different antenna configuration than specified by the first operational profile.

16. The source device of claim 13, where the communication adaptation circuitry is configured to determine the impacted time period before the impacted time period starts using the noise prediction data.

17. The source device of claim 13, where the communication adaptation circuitry is configured to, after the impacted time period ends, resume operating according to the first operational profile to communicate with the destination device.

18. The source device of claim 13, where:

the memory is further configured to store a third operational profile; and the communication adaptation circuitry is further configured to:

access predicted movement data indicating of a predicted location for a nomadic device;

determine the predicted location for the nomadic device will obstruct a wireless communication pathway between the source device and the destination device; and select the third operational profile to account for the predicted location of the nomadic device.

19. A method comprising:

in a source device that communicates:

communicating with a destination device using a first communication technology;

accessing noise prediction data established for future functioning characteristic of a manufacturing device, the noise prediction data indicating predicted noise along a communication pathway from the source device to the destination device for the first communication technology;

determining an adaptation trigger criterion by analyzing the predicted noise;

determining an impacted time period during which an effect by the predicted noise arising from the future functioning characteristic of the manufacturing device on communication with the destination device using the first communication technology would meet the adaptation trigger criterion; and adapting, during the impacted time period, a subsequent communication to the destination device.

20. The method of claim 19, where the adaptation trigger criterion comprises a noise level, a decibel threshold, a distortion level, a signal-to-noise ratio, or any combination thereof.

* * * * *